(12) United States Patent
Heinrich et al.

(10) Patent No.: US 10,393,942 B2
(45) Date of Patent: Aug. 27, 2019

(54) COLOR SHIFTING ILLUMINATOR

(71) Applicant: X Development LLC, Mountain View, CA (US)

(72) Inventors: Mitchell Heinrich, Oakland, CA (US); Martin F. Schubert, Mountain View, CA (US); Michael J. Grundmann, San Jose, CA (US); William R. Regan, San Carlos, CA (US)

(73) Assignee: X Development LLC, Mountain View, CA (US)

( * ) Notice: Subject to any disclaimer, the term of this patent is extended or adjusted under 35 U.S.C. 154(b) by 0 days.

(21) Appl. No.: 16/144,620

(22) Filed: Sep. 27, 2018

(65) Prior Publication Data

US 2019/0025495 A1  Jan. 24, 2019

Related U.S. Application Data

(62) Division of application No. 15/092,013, filed on Apr. 6, 2016, now Pat. No. 10,114,165.

(51) Int. Cl.
| | |
|---|---|
| *F21V 8/00* | (2006.01) |
| *A01G 9/20* | (2006.01) |
| *A01G 22/00* | (2018.01) |
| *A01G 9/26* | (2006.01) |

(52) U.S. Cl.
CPC .............. *G02B 6/0036* (2013.01); *A01G 9/20* (2013.01); *A01G 9/26* (2013.01); *A01G 22/00* (2018.02); *G02B 6/0016* (2013.01); *G02B 6/0026* (2013.01); *G02B 6/0033* (2013.01); *G02B 6/0045* (2013.01); *G02B 6/0065* (2013.01); *G02B 6/0066* (2013.01); *G02B 6/0076* (2013.01); *G02B 6/0095* (2013.01)

(58) Field of Classification Search
CPC .. G02B 6/0026; G02B 6/0033; G02B 6/0036; G02B 6/0065; G02B 6/0066; G02B 6/005; G02B 6/0075; G02B 6/0076; G02B 6/0095; G02B 6/0016; A01G 22/00; A01G 9/20; A01G 7/0045; H01L 31/55
USPC ........ 385/31, 36, 37, 39, 129, 901; 362/231, 362/235; 47/58.1 LS
See application file for complete search history.

(56) References Cited

U.S. PATENT DOCUMENTS

| | | |
|---|---|---|
| 8,551,769 B2 | 10/2013 | Falber |
| 8,847,487 B2 | 9/2014 | Davis et al. |

(Continued)

*Primary Examiner* — Michael P Mooney
(74) *Attorney, Agent, or Firm* — Christensen O'Connor Johnson Kindness PLLC

(57) ABSTRACT

A color shifting illuminator includes a first luminescent material that absorbs first incident photons having an energy greater than or equal to a first threshold energy, and emits first photons with less energy than the first incident photons. The color shifting illuminator also includes a second luminescent material that absorbs second incident photons having an energy greater than or equal to a second threshold energy, and emits second photons with less energy than the second incident photons and less energy than the first photons. The first luminescent material and the second luminescent material are included in a waveguide, and the waveguide exhibits total internal reflection for the first photons and the second photons satisfying conditions for total internal reflection. An extraction region is coupled to the waveguide to emit the first photons and the second photons.

15 Claims, 9 Drawing Sheets

(56) References Cited

U.S. PATENT DOCUMENTS

2004/0095658 A1* 5/2004 Buretea ............... B82Y 20/00
                                                     359/853
2013/0241435 A1    9/2013 Lamvik et al.
2017/0299797 A1   10/2017 Ezell et al.

* cited by examiner

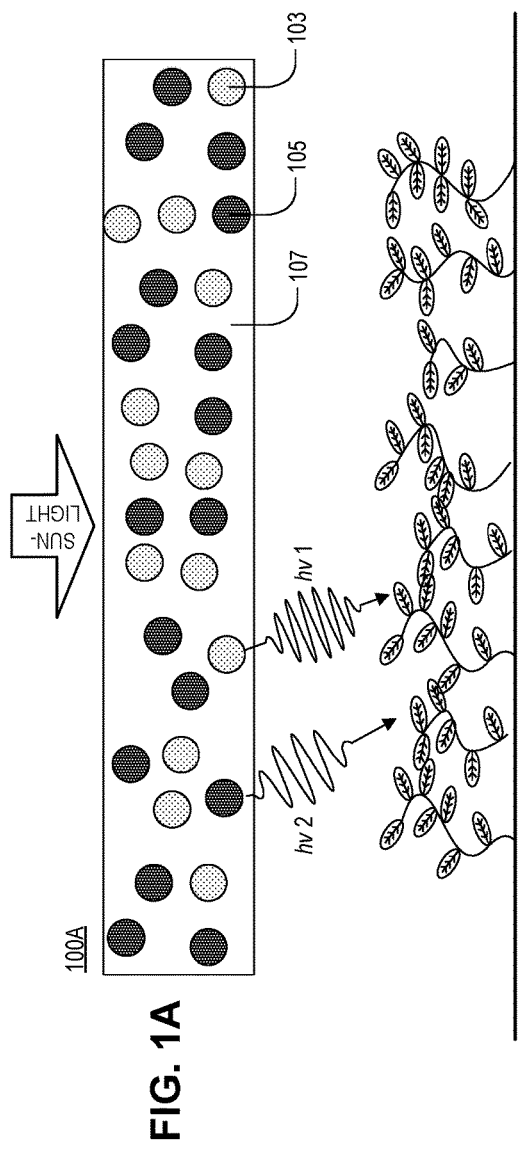
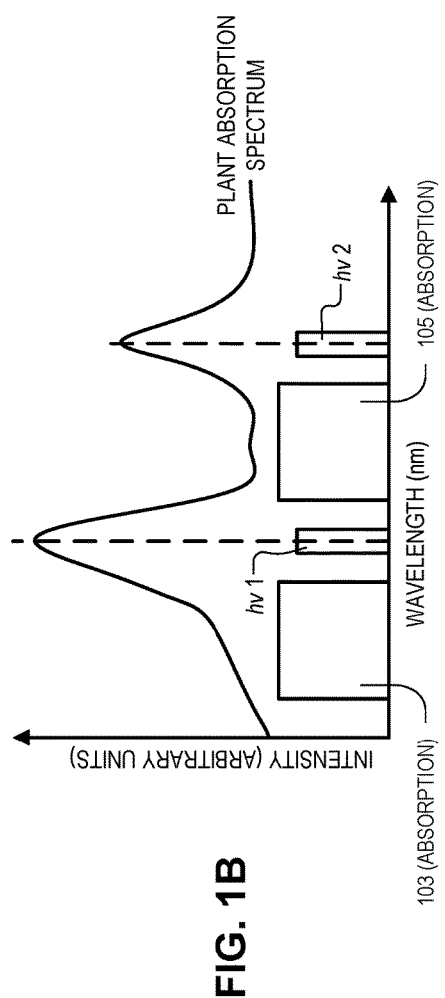
FIG. 1A
FIG. 1B

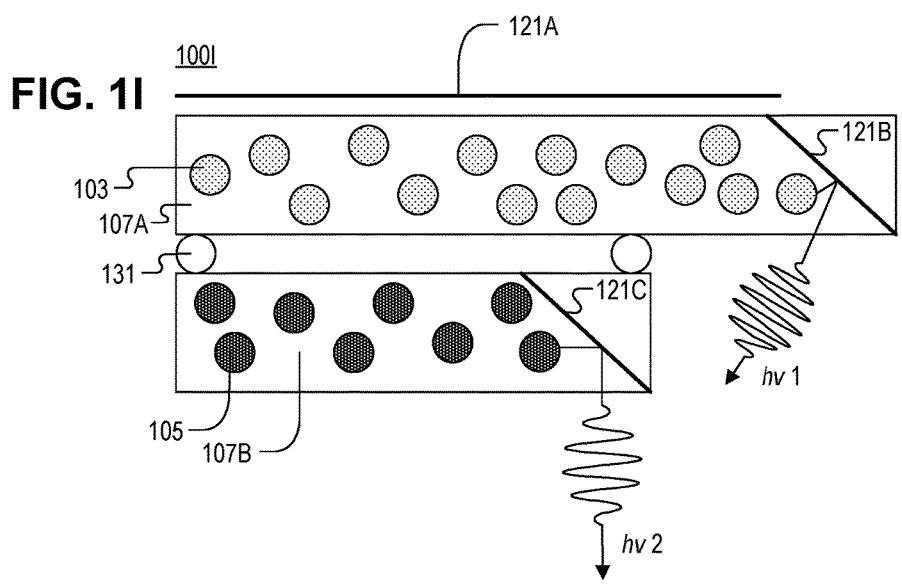
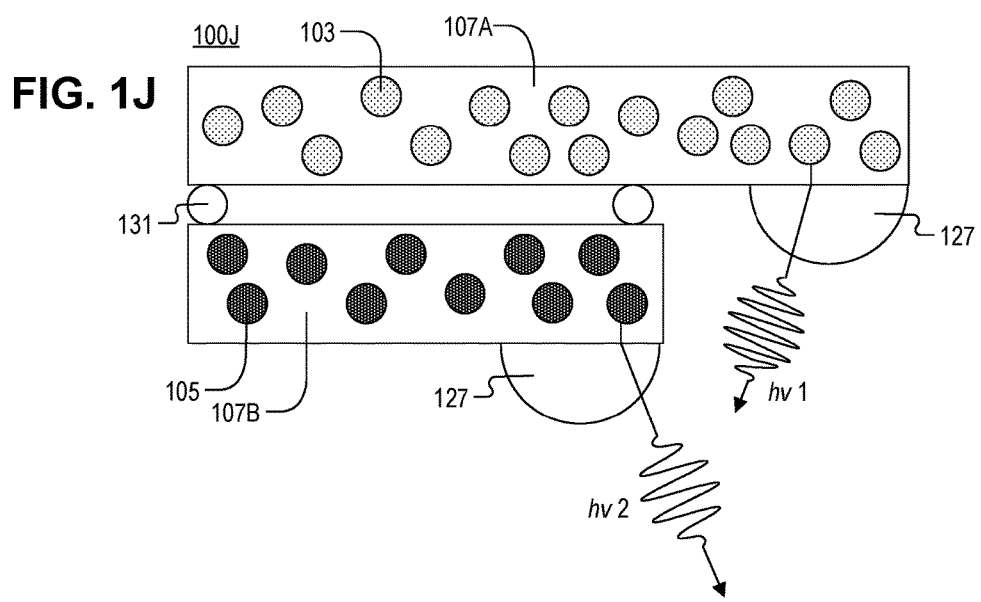

COLOR SHIFTING ILLUMINATOR

CROSS-REFERENCE TO RELATED APPLICATIONS

This application is a divisional of U.S. patent application Ser. No. 15/092,013, filed on Apr. 6, 2016, which is hereby incorporated by reference.

TECHNICAL FIELD

This disclosure relates generally to optics, and in particular but not exclusively, relates to wavelength conversion.

BACKGROUND INFORMATION

Vertical farming is a method of producing plants in stacked layers. Vertical farming generally utilizes controlled growing environments where factors like light, moisture, temperature, humidity, concentration of gasses, etc. are fastidiously maintained to optimize plant growth. This horticultural technique has the potential to revolutionize the way we produce and consume food by allowing for ultra-high density farming in urban environments.

Unlike traditional agriculture, indoor farming allows for production of crops year-round. All season farming may boost productivity of the farmed space by a factor of four or more depending on the crop being farmed. Not only can vertical farming practices produce more food per square foot, but can also mitigate major problems in agriculture such as spoilage/poor-freshness, shipping (both associated pollution and costs), and contamination.

However, many question the profitability of vertical farming. The costs of lighting, heat, power, etc. may negate any savings resulting from reduced transportation expenses. Furthermore, depending on the type of power used (e.g., coal, nuclear, hydroelectric, etc.), a vertical farm may produce more greenhouse gasses per plant than conventionally grown produce.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. The drawings are not necessarily to scale, emphasis instead being placed upon illustrating the principles being described.

FIG. 1A is an illustration of a color shifting illuminator, in accordance with an embodiment of the disclosure.

FIG. 1B is an illustration of absorption and emission spectra corresponding to the color shifting illuminator of FIG. 1A, in accordance with an embodiment of the disclosure.

FIG. 1I is an illustration of a color shifting illuminator, in accordance with an embodiment of the disclosure.

FIG. 1J is an illustration of a color shifting illuminator, in accordance with an embodiment of the disclosure.

DETAILED DESCRIPTION

Figure 1C:
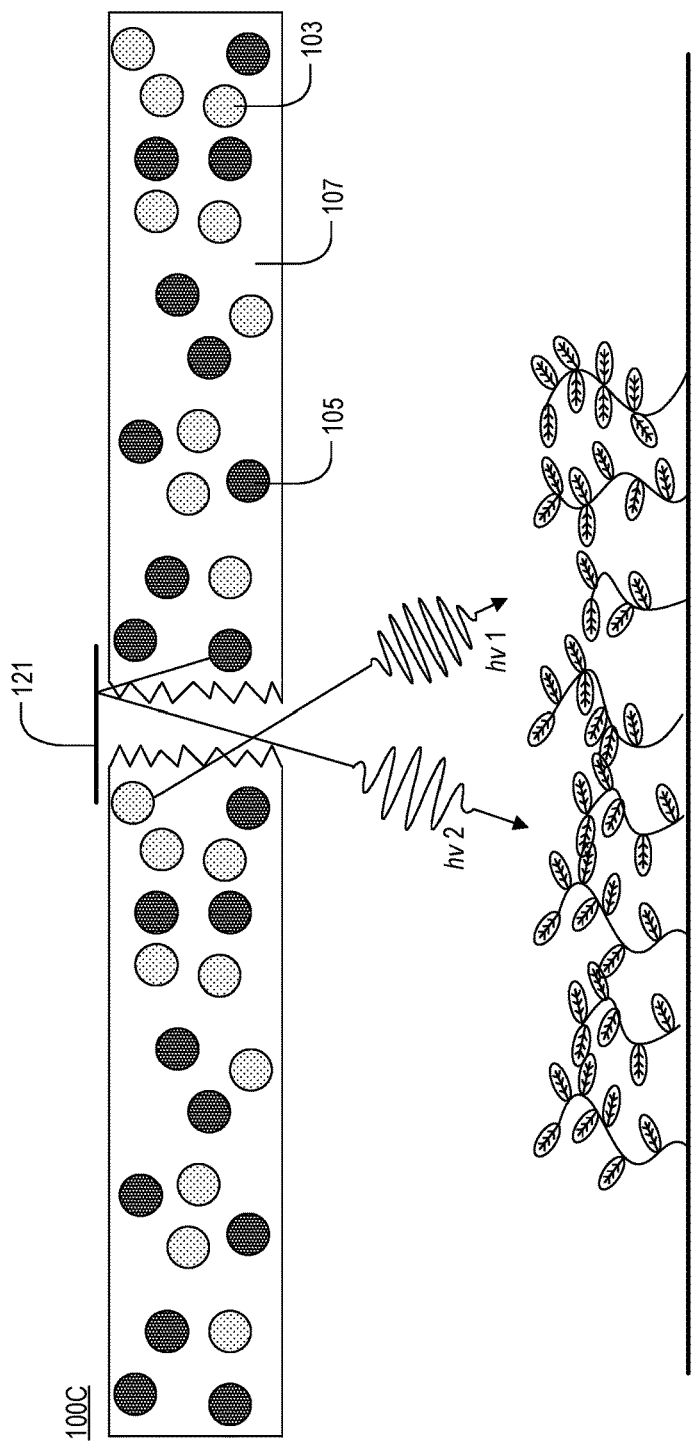
FIG. 1C is an illustration of a color shifting illuminator, in accordance with an embodiment of the disclosure.

Embodiments of an apparatus and method for color shifting illumination are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

It should be noted that the word "plant" in this disclosure refers to any photosynthetic organism including microalgae and organisms that exhibit photofermentation.

FIGS. 1A-1J either depict embodiments of a color shifting illuminator, or an example absorption/emission spectrum consistent with an embodiment of a color shifting illuminator. While each embodiment of a color shifting illuminator illustrated in FIGS. 1A-1J will be discussed in turn, it is worth noting that all embodiments share several key features, namely: first luminescent material 103, second luminescent material 105, and waveguide(s) 107. Further, each embodiment also depicts at least one extraction region (see e.g., reflectors 121, and textured structures 125); however, in some embodiments the extraction region may be too small to depict clearly (as will be explained later).

FIG. 1A is an illustration of color shifting illuminator 100A, in accordance with an embodiment of the disclosure. Color shifting illuminator 100A includes first luminescent material 103 (e.g., quantum dots) that absorbs first incident photons (sunlight) having an energy greater than or equal to a first threshold energy. In response to absorbing the first incident photons, first luminescent material 103 emits first photons (hv 1) with less energy than the first incident photons. Color shifting illuminator 100A also includes second luminescent material 105 (e.g., quantum dots) that absorbs second incident photons (sunlight) having an energy greater than or equal to a second threshold energy. In response to absorbing the second incident photons, second luminescent material 105 emits second photons (hv 2) with less energy than the second incident photons, and less energy than the first photons. As will be discussed in greater detail later, the first threshold energy may be equal to a bandgap energy of first luminescent material 103, and the second threshold energy may equal to a bandgap energy of the second luminescent material 105. In one embodiment, the first incident photons may be a portion of the solar spectrum having enough energy to excite electrons into the conduction band of first luminescent material 103, and the second incident photons may be a portion of solar spectrum having enough energy to excite electrons into the conduction band of second luminescent material 105.

As depicted, first luminescent material 103 and second luminescent material 105 are included in waveguide 107. Waveguide 107 exhibits total internal reflection for first photons and second photons satisfying conditions for total internal reflection. In several embodiments, waveguide 107 may be a rectangular or circular pane (i.e., a slab waveguide) of clear glass, plastic, or other dielectric which may be used as a window. Alternatively, waveguide 107 may be columnar (e.g., with a circular or polygonal cross section), and transport first and second photons over an extended distance. Waveguide 107 may be flexible or have a curved structure depending on the desired application.

Although not directly shown in FIG. 1A, an extraction region is coupled to waveguide 107 to emit the first photons (hv 1) and the second photons (hv 2). In the depicted embodiment, the extraction region may be a scratched/micro-textured bottom surface of color shifting illuminator 100A, which disrupts the conditions for total internal reflection in waveguide 107. The extraction region may be continuous along waveguide 107 or arranged into discrete sections to control the location of light output. This allows first photons and second photons to exit the bottom of color shifting illuminator 100A and illuminate plants. However, the extraction region may be any structure which facilitates photon extraction.

FIG. 1B is an illustration of absorption and emission spectra corresponding to the color shifting illuminator 100A of FIG. 1A, in accordance with an embodiment of the disclosure. One skilled in the art will appreciate the spectra depicted in FIG. 1B are idealized and may only approximate the actual system. Furthermore, the plant absorption spectrum has been shifted above the absorption/emission spectra of first luminescent material 103 and second luminescent material 105 for the purpose of showing alignment.

As depicted, first luminescent material 103 absorbs photons with energy above the first maxima of the plant absorption spectrum, and then emits first photons (hv 1) with energy corresponding to a first absorption maxima of the plant absorption spectrum (i.e., chlorophyll absorption spectrum). Similarly, second luminescent material 105 absorbs photons with energy above the second maxima of the plant absorption spectrum and then emits second photons (hv 2) with energy corresponding to the second absorption maxima of the plant absorption spectrum. This allows portions of the solar spectrum, which are otherwise useless to photosynthetic organisms, to be converted into easily absorbed wavelengths of light, maximizing potential plant yield. In one embodiment, the first photons include blue light and the second photons include red light.

In the depicted embodiment, the emission spectrum of first luminescent material 103 is substantially excluded from the absorption spectrum of second luminescent material 105. Thus, none (or very few) of the photons emitted from first luminescent material 103 are absorbed by second luminescent material 105, allowing both first luminescent material 103 and second luminescent material 105 to exist in the same waveguide 107 with minimal losses.

FIG. 1C is an illustration of color shifting illuminator 100C, in accordance with an embodiment of the disclosure. Color shifting illuminator 100C is similar to color shifting illuminator 100A in many respects; however, color shifting illuminator 100C utilizes a discontinuous region of waveguide 107 as an extraction region. As shown, waveguide 107 has been torn apart into two separate regions. The torn surface of waveguide 107 is textured to promote extraction of the first photons and the second photons. The defects on the torn edges of waveguide 107 disrupt total internal reflection. Accordingly, the torn region serves as the extraction region where the first photons and the second photons exit waveguide 107. Furthermore a reflector 121 (which may or may not be wavelength selective) is disposed on one side of color shifting illuminator 100C to reflect first and second photons exiting waveguide 107.

Figures 1D, 1E:
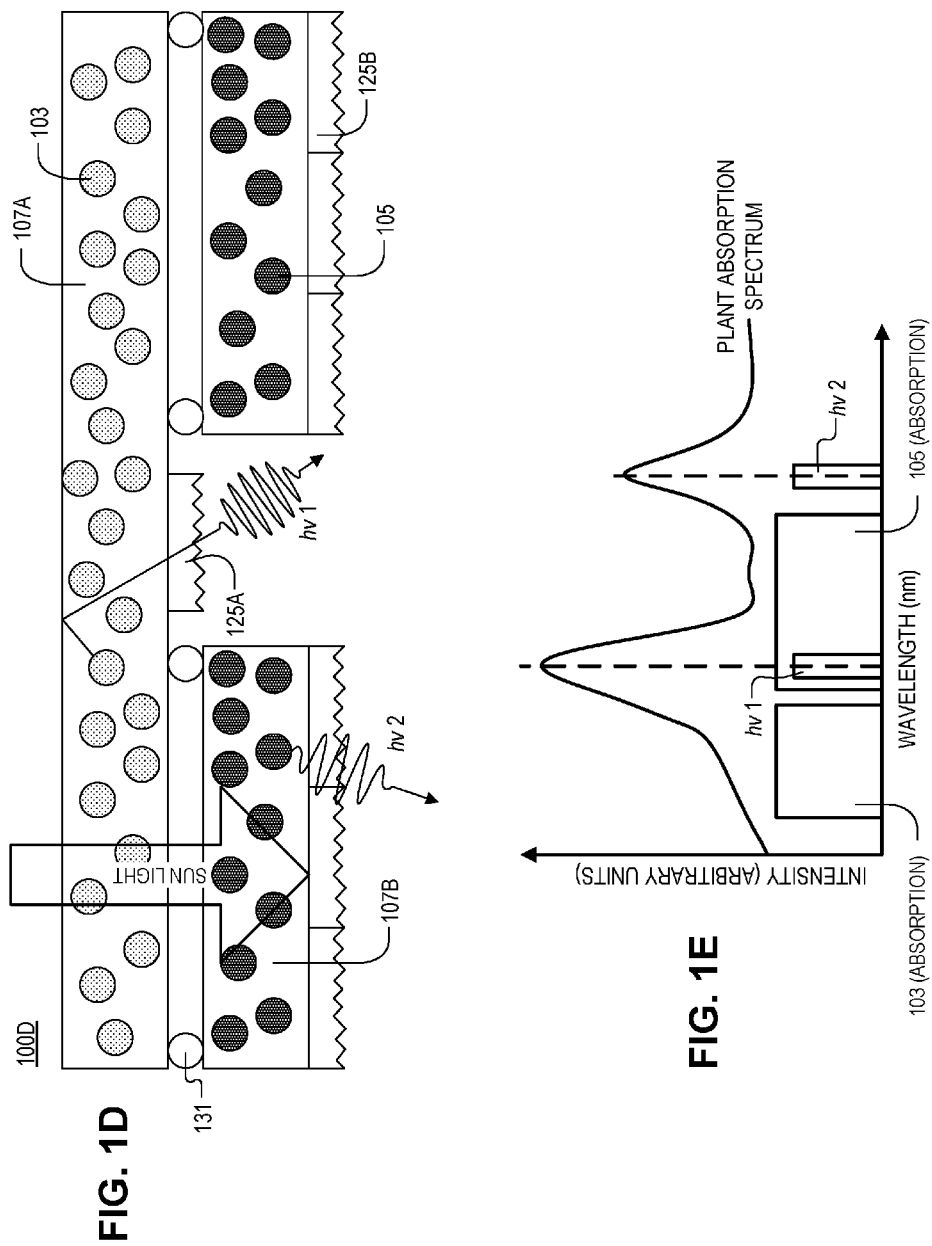
FIG. 1D is an illustration of a color shifting illuminator, in accordance with an embodiment of the disclosure.
FIG. 1E is an illustration of absorption and emission spectra corresponding to the color shifting illuminator of FIG. 1D, in accordance with an embodiment of the disclosure.

FIG. 1D is an illustration of color shifting illuminator 100D, in accordance with an embodiment of the disclosure. Color shifting illuminator 100D includes first luminescent material 103 that absorbs first incident photons (sunlight) having an energy greater than or equal to a first threshold energy. In response to absorbing the first incident photons, first luminescent material 103 emits first photons (hv 1) with less energy than the first incident photons. Color shifting illuminator 100D also includes second luminescent material 105 that absorbs second incident photons having an energy greater than or equal to a second threshold energy. In response to absorbing the second incident photons, second luminescent material 105 emits second photons with less energy than the second incident photons, and less energy than the first photons. First luminescent material 103 is included in a first waveguide 107A, and first waveguide 107A exhibits total internal reflection for first photons satisfying conditions for total internal reflection. Second luminescent material 105 is included in second waveguide 107B, and the second waveguide 107B exhibits total internal reflection for the second photons satisfying the conditions for total internal reflection. In the depicted embodiment, first luminescent material 103 and second luminescent material 105 are randomly dispersed in waveguides 107A and 107B, however, in other embodiments luminescent materials may form ordered structures within first and second waveguides 107A and 107B.

A first extraction region (e.g., textured region 125A) is coupled to first waveguide 107A to emit the first photons, and a second extraction region (e.g., textured regions 125B) is coupled to second waveguide 107B to emit the second photons. Textured regions 125 may have random texturing (e.g., randomly oriented ridges/bumps) or may have ordered texturing (e.g., ridges/bumps with periodicity). Spacers 131 are disposed between first waveguide 107A and second waveguide 107B. While spacers 131 are circular, in other embodiments spacers 131 may take other shapes such as square, rectangular, or the like. Although in the depicted embodiment a space exists between first waveguide 107A and second waveguide 107B, in other embodiments, there may not be a space. First waveguide 107A and second waveguide 107B may be separated by a sheet of transparent dielectric material (with a lower dielectric constant than first waveguide 107A and second waveguide 107B). Alternatively, first waveguide 107A and second waveguide 107B may be in contact but have different indices of refraction (and different dielectric constants). First waveguide 107A may have a higher index of refraction than second waveguide 107B, or vice versa.

As depicted, first waveguide 107A and second waveguide 107B optically overlap, at least in part, so that the second incident photons encounter first waveguide 107A and second waveguide 107B. However, emission efficiency is not reduced because an optical pathway—which is substantially devoid of second luminescent material 105—extends outward from the first extraction region (e.g., textured region 125A). Thus, first photons are not absorbed by second luminescent material 105, as will be discussed further in connection with FIG. 1E. In the depicted embodiment, the optical pathway is the result of a discontinuous second waveguide 107B.

FIG. 1E is an illustration of absorption and emission spectra corresponding to color shifting illuminator 100D of FIG. 1D, in accordance with an embodiment of the disclosure. One skilled in the art will appreciate the spectra depicted in FIG. 1D are idealized and may only approximate the actual system. Furthermore, the plant absorption spectrum has been shifted above the absorption/emission spectra of first luminescent material 103 and second luminescent material 105 for the purpose of showing alignment.

As in FIG. 1B emission spectra of first luminescent material 103 and second luminescent material 105 align with maxima in the plant/chlorophyll absorption spectra. However, as illustrated, the emission spectrum (hv 1) of first luminescent material 103 is included in the absorption spectrum of second luminescent material 105. Accordingly, first luminescent material 103 and second luminescent material 105 have been separated into discrete waveguides (as depicted in FIG. 1D) so first photons are not absorbed by second luminescent material 105. This separation of first luminescent material 103 and second luminescent material 105 helps to curb unnecessary energy loss. Instead, first photons exit waveguide 107A with an optical path clear of obstruction, and can be efficiently absorbed by plants.

Figure 1F:
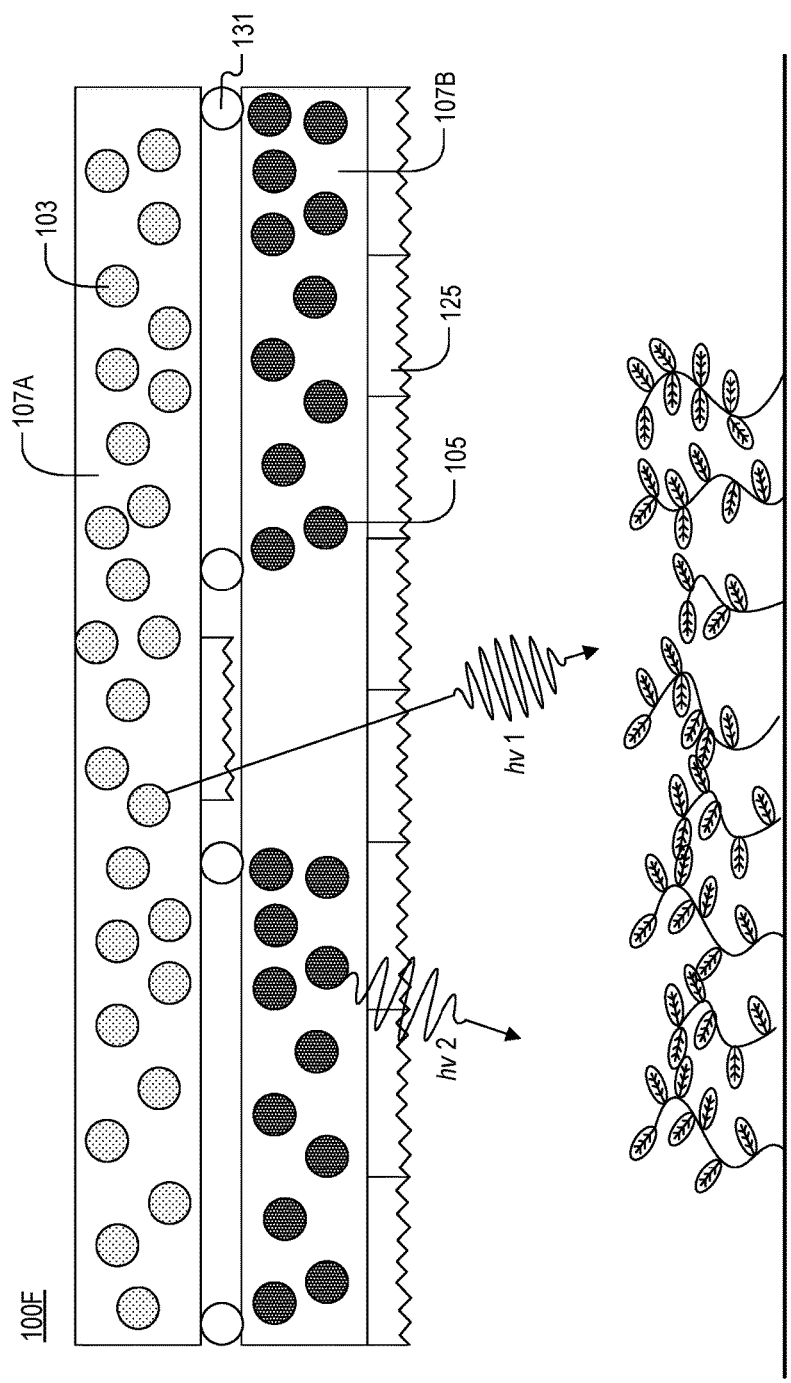
FIG. 1F is an illustration of a color shifting illuminator, in accordance with an embodiment of the disclosure.

FIG. 1F is an illustration of color shifting illuminator 100F, in accordance with an embodiment of the disclosure. Color shifting illuminator 100F is similar in many respects to color shifting illuminator 100D in FIG. 1D; however, second waveguide 107B in color shifting illuminator 100F is continuous, while still allowing for efficient extraction of first photons. In the depicted embodiment, first photons are free to travel from first waveguide 107A into second waveguide 107B, but may pass freely through second waveguide 107B due to the portion of second waveguide 107B which is substantially devoid of second luminescent material 105. As shown, surfaces of the first extraction region and the second extraction region are textured to promote out-coupling of the first photons and the second photons.

Figure 1G:
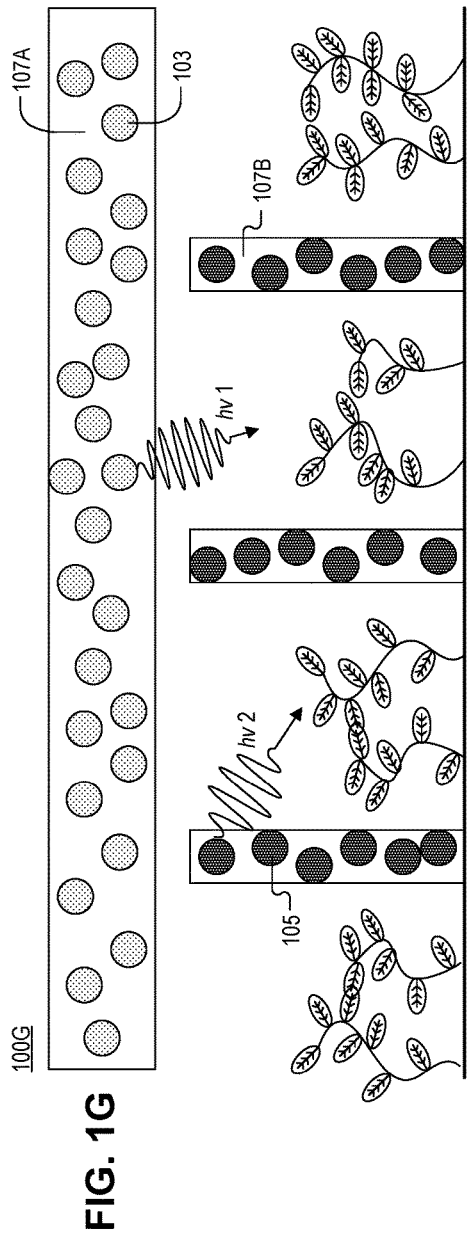
FIG. 1G is an illustration of a color shifting illuminator, in accordance with an embodiment of the disclosure.

FIG. 1G is an illustration of color shifting illuminator 100G, in accordance with an embodiment of the disclosure. Color shifting illuminator 100G is similar in many respects to color shifting illuminator 100F in FIG. 1F; however, first waveguide 107A and second waveguides 107B are not parallel to one another; instead, first waveguide 107A and second waveguides 107B are orthogonally oriented. As shown, second waveguides 107B are disposed between rows of plants. This may help to increase farm efficiency by exposing the sides/undersides of plant leaves—which may otherwise be obscured by foliage—to red photons.

In other embodiments, second waveguides 107B may encircle individual plants or may be disposed as strips of material hanging from first waveguide 107A. One skilled in the relevant art will appreciate that second waveguides 107B may be arranged into any configuration to enhance the number of second photons incident on the individual plants.

Figure 1H:
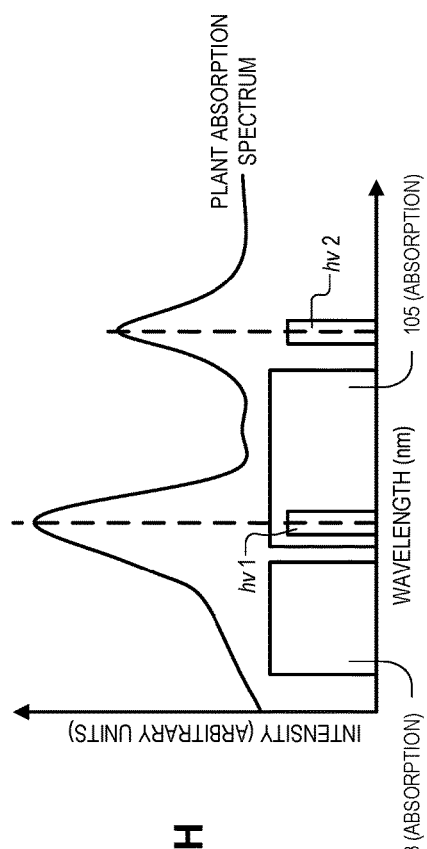
FIG. 1H is an illustration of absorption and emission spectra corresponding to the color shifting illuminator of FIG. 1G, in accordance with an embodiment of the disclosure.

FIG. 1H is an illustration of absorption and emission spectra corresponding to color shifting illuminator 100G of FIG. 1G, in accordance with an embodiment of the disclosure. One skilled in the art will appreciate the spectra depicted in FIG. 1H are idealized and may only approximate the actual system. Furthermore, the plant absorption spectrum has been shifted above the absorption/emission spectra of first luminescent material 103 and second luminescent material 105 for the purpose of showing alignment.

As shown, emission spectra of first luminescent material 103 and second luminescent material 105 align with maxima in the plant/chlorophyll absorption spectra. However, in the depicted embodiment, the emission spectrum (hv 1) of first luminescent material 103 is included in an absorption spectrum of second luminescent material 105. Accordingly, first luminescent material 103 and second luminescent material 105 have been separated into individual waveguides. In one embodiment, a wavelength specific reflective material may be disposed on the outside of second waveguide 107B which reflects only the first photons. However, wavelength specific reflectors and other secondary optics (lenses, filters, etc.) may be placed anywhere on color shifting illuminator 100G to improve device performance.

FIG. 1I is an illustration of color shifting illuminator 100I, in accordance with an embodiment of the disclosure. Color shifting illuminator 100I is similar in many respects to the other multi-waveguide color shifting illuminators described herein; however, reflectors 121 are used to both (1) help contain light within color shifting illuminator 100I, and (2) extract light from color shifting illuminator 100I. As depicted, a reflector 121A is disposed above first waveguide 107A. Reflector 121A is a wavelength-selective reflective material disposed between the incident photons and the color shifting illuminator. Solar photons having a wavelength falling within the absorption spectrum of first luminescent material 103 and second luminescent material 105, may travel through reflective material 121A, and enter first waveguide 107A and second waveguide 107B. Moreover, reflector 121A reflects light with a wavelength corresponding to the emission spectrums of first luminescent material 103 and/or second luminescent material 105. Thus, reflector 121A helps contain first and second photons in first waveguide 107A and second waveguide 107B, respectively.

Although in the depicted embodiment, reflector 121A is only disposed above first waveguide 107A, in other embodiments, reflector 121A may be disposed in other locations around a singular waveguide or around multiple waveguides. Furthermore, one skilled in the art will recognize that the reflective properties of reflector 121A may be tailored to transmit/reflect a variety of wavelengths.

Reflector 121B and reflector 121C serve an entirely different purpose: both are used as extraction regions. When first photons and second photons encounter reflector 121B and reflector 121C, in some instances, the conditions for total internal reflection are disrupted. Accordingly, first and second photons are reflected off of reflector 121B and reflector 121C, and out of first waveguide 107A and second waveguide 107B, respectively.

FIG. 1J is an illustration of color shifting illuminator 100J, in accordance with an embodiment of the disclosure. Color shifting illuminator 100J is similar in many respects to color shifting illuminator 100I; however, rather than employing reflector 121 as extraction regions, color shifting illuminator 100J uses secondary optical structures to disrupt total internal reflection within first waveguide 107A and second waveguide 107B. As shown two lenses 127—which may be constructed out of the same material as waveguides 107A and 107B—are used to direct first photons and second photons out of first waveguide 107A and second waveguide 107B, respectively. However, in other embodiments a plurality of lenses 127 coupled to each waveguide may be used. Lenses 127 (or other extraction structures) may be arranged into rows and columns along first waveguide 107A and second waveguide 107B.

In one embodiment, first waveguide 107A and second waveguide 107B may be transparent polymer; however, in other embodiments, first waveguide 107A and second waveguide 107B may include glasses (such as borosilicate) and may be hollow and/or filled with gasses or liquids.

Figure 2:
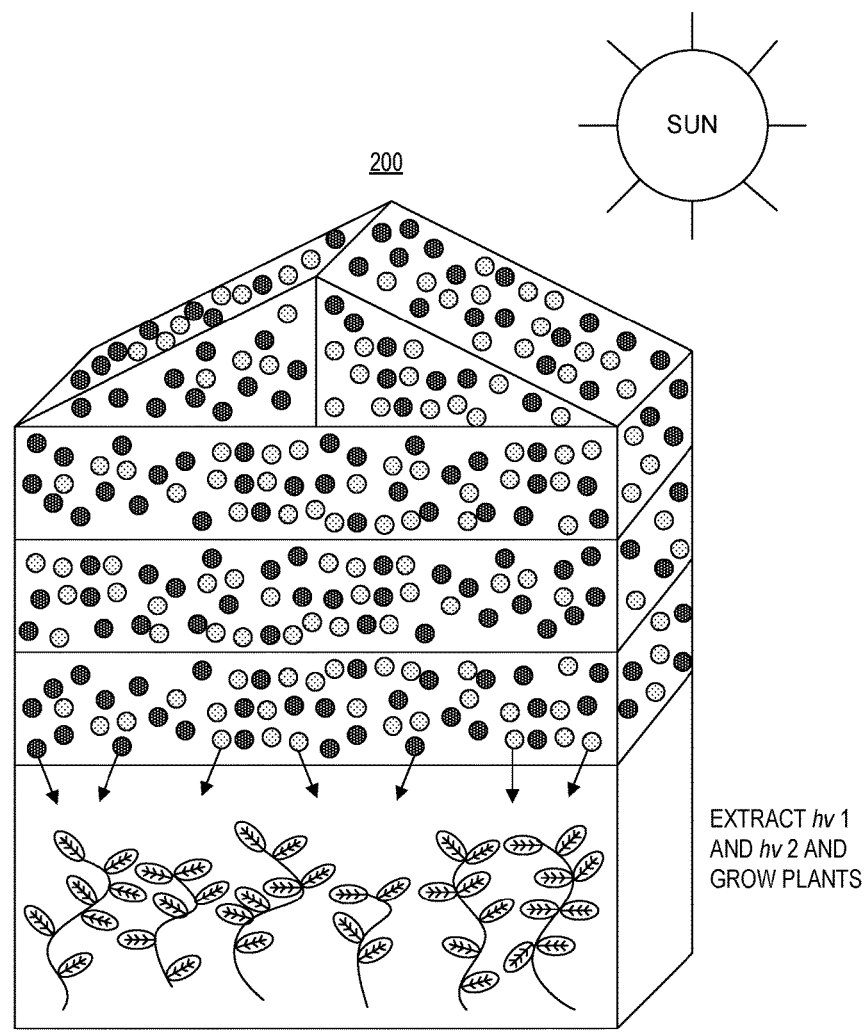
FIG. 2 is an illustration of one use for the color shifting illuminators of FIGS. 1A-1J, in accordance with an embodiment of the disclosure.

FIG. 2 is an illustration of one use for the color shifting illuminators of FIGS. 1A-1J, in accordance with an embodiment of the disclosure. In the depicted embodiment color shifting illuminators are window panes disposed on the roof and side walls of a greenhouse 200 to absorb sunlight and output light with wavelengths favorable to the plants inside. While the illustration shows that color shifting illuminators are only disposed on approximately half of the sidewalls of greenhouse 200, in other embodiments, the entire greenhouse 200 may be covered with color shifting illuminators. Further, the color shifting illuminators may be used in conjunction with other technologies to maximize conversion of light harvested from the sun into usable energy (either for growing plants or otherwise). For example, color shifting illuminators may be used concurrently with photovoltaic devices which absorb portions of the EM spectrum that are poorly absorbed by the color shifting illuminators.

While the color shifting illuminators depicted in FIG. 2 are of the single waveguide variety (e.g., FIG. 1A), any embodiment of color shifting illuminators described herein may be used to illuminate the interior of greenhouse 200. Depending on the plants grown in greenhouse 200, different luminescent materials may be needed to best match the absorption spectra of the plants. As shown the emission/absorption spectra of the luminescent materials used may impact the design of the color shifting illuminators.

Additionally, while only one use for color shifting illuminators is depicted here, one skilled in the relevant art will appreciate that color shifting illuminators have many uses and should not be limited to agricultural purposes. For instance, color shifting illuminators may be used to convert photons in the invisible EM spectrum into photons in the visible EM spectrum, or may be used as an optical pump for other light emitting devices.

Figure 3:
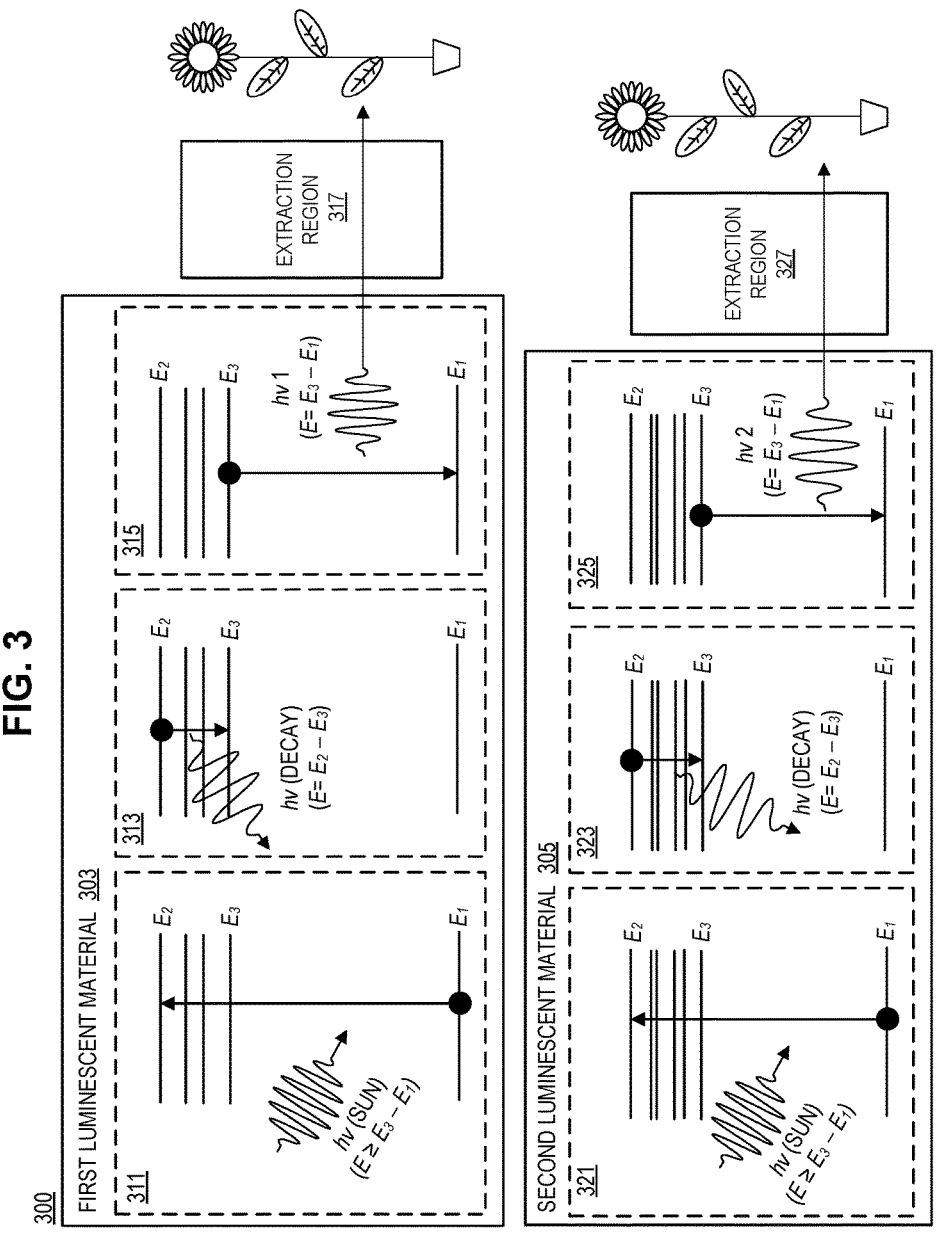
FIG. 3 illustrates the physics underlying the color shifting illuminators of FIGS. 1A-1J, in accordance with several embodiments of the disclosure.

FIG. 3 illustrates the physics underlying the color shifting illuminators of FIGS. 1A-1J, in accordance with several embodiments of the disclosure. One of ordinary skill in the art having the benefit of the present disclosure will understand that each process depicted may be occurring at the same time when the device is in operation. It is appreciated that absorption and emission of photons is governed by the equation E=hv, where "E" is the energy of electromagnetic radiation, "h" is Planck's constant, and "v" is the frequency of electromagnetic radiation. The size of energy gaps depicted and specific energy values are arbitrary and may take any configuration.

In first luminescent material 303, block 311 depicts receiving and absorbing first incident photons (hv(SUN)) from the sun, with first luminescent material 303. First incident photons have an energy greater than or equal to a bandgap energy ($E_3-E_1$) of first luminescent material 303. Here, first incident photons have energy greater than the bandgap energy of first luminescent material 303, and electrons are excited to an available state ($E_2$) well above the first available state ($E_3$).

Block 313 shows decay of an electron from ($E_2$) to ($E_3$). As shown, a low energy photon (hv(DECAY)) is emitted with energy equal to the potential difference between states ($E_2$) and ($E_3$). However, in other embodiments, the energy released from the electron decay may manifest as lattice vibrations in first luminescent material 303.

Block 315 illustrates emission of first photon (hv 1) from first luminescent material 303. The first photon has energy equal to the bandgap energy of first luminescent material 303 ($E_3-E_1$). The first photon is emitted through a spontaneous emission process, and is therefore emitted in a random direction. However, in other embodiments, the first photon may be emitted through a stimulated emission process.

As depicted, photon emission by first (and/or second) luminescent material 303 may involve electronics states that do not significantly contribute to the absorption behavior of the material: energy state ($E_2$) absorbs first incident photons while energy state ($E_3$) emits first photons. A practical example of this behavior is first luminescent material 303 absorbing blue and green light, but emitting red light. In one embodiment, these absorption/emission properties are achieved using a first semiconductor structure (which absorbs shorter wavelengths of light), electronically coupled to a second semiconductor structure (which emits longer wavelengths of light). For instance, the semiconductor material may include a giant-core-shell quantum dot, or a molecule having several dedicated emission centers.

In second luminescent material 305, block 321 depicts receiving and absorbing second incident photons (hv(SUN)) from the sun, with second luminescent material 305. Second incident photons have an energy greater than or equal to a bandgap energy ($E_3-E_1$) of second luminescent material 305. Here, second incident photons have energy greater than the bandgap energy, and electrons are excited into an available state ($E_2$), well above the first available state ($E_3$). It is worth noting that the band structures of first luminescent material 303 and second luminescent material 305 are different: first luminescent material 303 has a lower density of states in the conduction band, and second luminescent material 305 has a narrower bandgap.

Block 323 shows decay of the electron from ($E_2$) to ($E_3$). As shown, a low energy photon (hv(DECAY)) is emitted with energy equal to the potential difference between states ($E_2$) and ($E_3$). However, in other embodiments the energy released from the electron decay may manifest as lattice vibrations in second luminescent material 305.

Block 325 illustrates emission of second photon (hv 2) from second luminescent material 305. The second photon has energy equal to the bandgap energy of second luminescent material 305 ($E_3-E_1$). Since the bandgap of second luminescent material 305 is smaller than the bandgap of first luminescent material 303, the second photon has lower energy than the first photon.

Extraction region 317 and extraction region 327 are optically coupled to first luminescent material 303 and second luminescent material 305, respectively. However, in one embodiment, extraction region 317 and extraction region 327 are one and the same. Further, both first luminescent material 303 and second luminescent material 305 may be included in a singular waveguide or two separate waveguides depending on desired device geometry/performance.

While the embodiments depicted so far have only included two different luminescent materials, in other embodiments, color shifting illuminators may include three or more luminescent materials with varying absorption and emission spectra. Luminescent materials may include semiconductor particles (more specifically quantum dots such as CdSe, CdSeZn, CdSeS, CdTe, and PbS quantum dots). However, in other embodiments, the luminescent materials may include other materials such as: organic small molecule/polymer dyes, giant shell-core quantum dots (including group II-VI or III-V compounds/elements), dot-in-rod quantum dots (including group II-VI or III-V compounds/elements), rare-earth-doped quantum dots/nanocrystals, chalcogenides, group four elements (e.g., C, Si, Ge, Sn, etc.), group 3 elements (B, Al, Ga, In, etc.), group 5 elements (N, P, As, Sb etc.), or the like. One skilled in the relevant art will appreciate that the materials listed above are not exhaustive and can be combined in any manner. Other material compositions not disclosed may also be used to achieve the results described herein.

Figure 4:
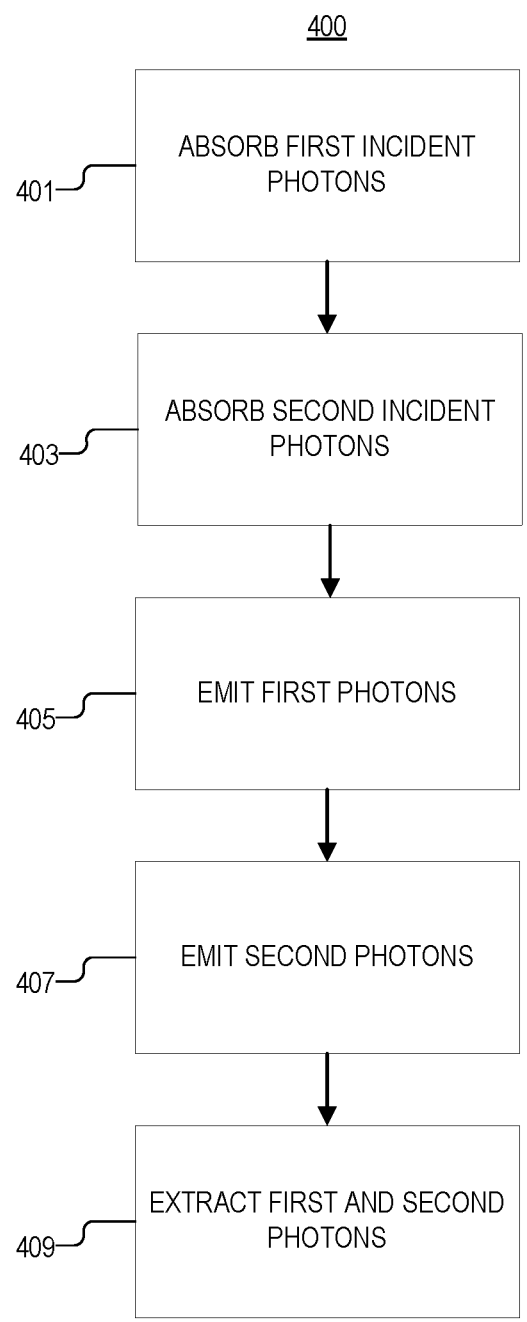
FIG. 4 is a flow chart illustrating a method of illumination, in accordance with several embodiments of the disclosure.

FIG. 4 is a flow chart illustrating a method of illumination, in accordance with several embodiments of the disclosure. The order in which some or all of process blocks 401-409 appear in method 400 should not be deemed limiting. Rather, one of ordinary skill in the art having the benefit of the present disclosure will understand that some of method 400 may be executed in a variety of orders not illustrated, or even in parallel.

Block 401 depicts absorbing first incident photons, having an energy greater than or equal to a first threshold energy, with a first luminescent material. In one embodiment, the threshold energy is equal to a bandgap energy of the luminescent material and the first incident photons include sunlight.

Block 403 illustrates absorbing second incident photons, having an energy greater than or equal to a second threshold energy, with a second luminescent material. In one embodiment, the second incident photons include sunlight.

Block 405 shows emitting first photons with the first luminescent material in response to receiving the first incident photons. The first photons have less energy than the first incident photons. In one embodiment, an emission spectrum of the first luminescent material may be substantially excluded from an absorption spectrum of the second luminescent material.

Block 407 details emitting second photons with the second luminescent material in response to receiving the second incident photons. The second photons have less energy than the second incident photons, and less energy than the first photons.

Block 409 shows extracting the first photons and the second photons from at least one waveguide. The first photons and the second photons are extracted via an extraction region. In one embodiment, extracting the first photons and the second photons may include using at least one structure to disrupt conditions for total internal reflection in the least one waveguide.

Although not depicted, in one embodiment, plants are positioned to receive first photons and second photons extracted from the at least one wave guide. This may promote plant growth because the energy of first photons may correspond to a first absorption maxima of chlorophyll, and the energy of the second photons may correspond to a second absorption maxima of chlorophyll.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A color shifting illuminator, comprising:
   a first luminescent material that absorbs first incident photons having an energy greater than or equal to a first threshold energy and, in response to absorbing the first incident photons, emits first photons with less energy than the first incident photons;
   a second luminescent material that absorbs second incident photons having an energy greater than or equal to a second threshold energy and, in response to absorbing the second incident photons, emits second photons with less energy than the second incident photons and less energy than the first photons;
   a waveguide including the first luminescent material and the second luminescent material, wherein the waveguide exhibits total internal reflection for the first photons and the second photons satisfying conditions for total internal reflection; and
   an extraction region coupled to the waveguide to emit the first photons and the second photons.

2. The color shifting illuminator of claim 1, wherein the first incident photons and the second incident photons include sunlight, and wherein the first threshold energy is equal to a bandgap energy of the first luminescent material, and wherein the second threshold energy is equal to a bandgap energy of the second luminescent material.

3. The color shifting illuminator of claim 1, wherein an emission spectrum of the first luminescent material is substantially excluded from an absorption spectrum of the second luminescent material.

4. The color shifting illuminator of claim 3, wherein the first luminescent material and the second luminescent material include quantum dots.

5. The color shifting illuminator of claim 1, wherein the energy of the first photons corresponds to a first absorption maxima of chlorophyll, and wherein the energy of the second photons corresponds to a second absorption maxima of chlorophyll.

6. The color shifting illuminator of claim 5, wherein the first photons include blue light and the second photons include red light.

7. The color shifting illuminator of claim 1, wherein a surface of the extraction region is textured to promote extraction of the first photons and the second photons.

8. A method of illumination, comprising:
   absorbing first incident photons, having an energy greater than or equal to a first threshold energy, with a first luminescent material;
   absorbing second incident photons, having an energy greater than or equal to a second threshold energy, with a second luminescent material;
   emitting first photons with the first luminescent material in response to receiving the first incident photons, wherein the first photons have less energy than the first incident photons;

emitting second photons with the second luminescent material in response to receiving the second incident photons, wherein the second photons have less energy than the second incident photons and the first photons; and extracting the first photons and the second photons from at least one waveguide, wherein the first photons and the second photons are extracted via an extraction region wherein extracting the first photons and the second photons includes using at least one structure to disrupt conditions for total internal reflection in the least one waveguide.

9. The method of claim 8, further comprising positioning plants to receive first photons and second photons.

10. The method of claim 9, wherein the energy of the first photons corresponds to a first absorption maxima of chlorophyll, wherein the energy of the second photons corresponds to a second absorption maxima of chlorophyll.

11. The method of claim 10, wherein the first incident photons and the second incident photons include sunlight.

12. The method of claim 8, wherein an emission spectrum of the first luminescent material is substantially excluded from an absorption spectrum of the second luminescent material.

13. The method of claim 8, wherein the first luminescent material and the second luminescent material are included in a single waveguide.

14. A method of illumination, comprising:
absorbing first incident photons, having an energy greater than or equal to a first threshold energy, with a first luminescent material;
absorbing second incident photons, having an energy greater than or equal to a second threshold energy, with a second luminescent material;
emitting first photons with the first luminescent material in response to receiving the first incident photons, wherein the first photons have less energy than the first incident photons;
emitting second photons with the second luminescent material in response to receiving the second incident photons, wherein the second photons have less energy than the second incident photons and the first photons; and
extracting the first photons and the second photons from at least one waveguide, wherein the first photons and the second photons are extracted via an extraction region, wherein the first luminescent material and the second luminescent material are included in a single waveguide.

15. A method of illumination, comprising:
absorbing first incident photons, having an energy greater than or equal to a first threshold energy, with a first luminescent material;
absorbing second incident photons, having an energy greater than or equal to a second threshold energy, with a second luminescent material;
emitting first photons with the first luminescent material in response to receiving the first incident photons, wherein the first photons have less energy than the first incident photons;
emitting second photons with the second luminescent material in response to receiving the second incident photons, wherein the second photons have less energy than the second incident photons and the first photons;
extracting the first photons and the second photons from at least one waveguide, wherein the first photons and the second photons are extracted via an extraction region; and
positioning plants to receive first photons and second photons.

* * * * *